United States Patent
Garbelli

(10) Patent No.: US 11,536,579 B2
(45) Date of Patent: Dec. 27, 2022

(54) METHODS AND SYSTEMS FOR DETERMINING A VEHICLE ROUTE BASED ON AN ESTIMATION OF THE WEIGHT OF THE VEHICLE

(71) Applicant: PIRELLI TYRE S.P.A., Milan (IT)

(72) Inventor: Daniele Garbelli, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 701 days.

(21) Appl. No.: 16/520,982

(22) Filed: Jul. 24, 2019

(65) Prior Publication Data
US 2020/0041297 A1  Feb. 6, 2020

(30) Foreign Application Priority Data
Jul. 31, 2018  (EP) .................................. 18186560

(51) Int. Cl.
| | | |
|---|---|---|
| G01C 21/00 | (2006.01) | |
| G01C 21/34 | (2006.01) | |
| B60C 23/02 | (2006.01) | |
| B60C 23/06 | (2006.01) | |
| B60C 23/20 | (2006.01) | |

(52) U.S. Cl.
CPC .......... G01C 21/3461 (2013.01); B60C 23/02 (2013.01); B60C 23/06 (2013.01); B60C 23/20 (2013.01)

(58) Field of Classification Search
CPC ......... B60C 23/02; B60C 23/06; B60C 23/20; G01C 21/3461
See application file for complete search history.

(56) References Cited

U.S. PATENT DOCUMENTS

| | | |
|---|---|---|
| 5,913,917 A | 6/1999 | Murphy |
| 8,615,344 B2 | 12/2013 | Boss et al. |

(Continued)

FOREIGN PATENT DOCUMENTS

| | | |
|---|---|---|
| EP | 0887211 A1 | 12/1998 |
| EP | 2722202 A1 | 4/2014 |
| EP | 3076131 A1 | 10/2016 |

OTHER PUBLICATIONS

Search Report and Written Opinion issued for EP Patent Application No. EP18186560.1 filed on Jul. 31, 2018, on behalf of Pirelli Tyre S.p.A. Date of Completion of Search: Jan. 29, 2019. 4 Pages.

*Primary Examiner* — Tyler J Lee
*Assistant Examiner* — Tiffany P Ohman
(74) *Attorney, Agent, or Firm* — Steinfl + Bruno LLP

(57) ABSTRACT

Method and system for determining a route for a vehicle. The method associates a navigation module to a vehicle fitted with tires and a tire monitoring unit to at least one tire fitted to the vehicle. The monitoring unit has a sensing element to generate a sensing signal descriptive of deformations undergone by the tire. The deformations form a contact area between the tire and a rolling surface on which the tire rotates. During rotation of the tire, the sensing signal, including the sensing signal generated in correspondence of passages of the sensing element through the contact area, is undersampled for a number of passages sufficient to obtain an estimated length of the contact area. The weight of the vehicle is then estimated based on such estimated length, and at least one route among two or more routes is selected, based on such estimated weight of the vehicle.

19 Claims, 7 Drawing Sheets

(56) References Cited

U.S. PATENT DOCUMENTS

| | | | |
|---|---|---|---|
| 8,706,416 B2 | 4/2014 | Wang et al. | |
| 2003/0010107 A1* | 1/2003 | Giustino | B60C 23/06 73/146 |
| 2014/0114558 A1* | 4/2014 | Singh | G01G 19/086 701/1 |
| 2016/0290815 A1* | 10/2016 | Tang | G01C 21/34 |

* cited by examiner

METHODS AND SYSTEMS FOR DETERMINING A VEHICLE ROUTE BASED ON AN ESTIMATION OF THE WEIGHT OF THE VEHICLE

CROSS REFERENCE TO RELATED APPLICATIONS

The present application claims priority to EP application EP18186560.1 filed on Jul. 31, 2018, the contents of which are incorporated herein by reference in their entirety.

FIELD

The present disclosure generally relates to the automotive field. More particularly, the present disclosure relates to methods and systems for selecting a vehicle route based on an estimation of the weight of the vehicle.

BACKGROUND

Vehicle navigation systems based on satellite systems, like the Global Positioning System (GPS), which provide geo-spatial positioning information of the vehicle, are known and used to determine a route from an origin to a destination. When two or more different routes exist to go from an origin to a destination, the different routes normally feature different route characteristics. For example, certain routes may be longer in terms of distance to travel (travel distance) than others. Or, certain routes may have greater travel times than others. Most, not to say all conventional vehicle navigation systems perform a route determination based on travel distance or travel time.

U.S. Pat. No. 8,706,416 discloses a method for determining a route for a vehicle that includes receiving input indicative of a driver's dynamic control of the vehicle, determining the driver's driving style based on the input, and selecting values of parameters representing the driver's anticipated dynamic control of the vehicle based on the driving style. The method also includes identifying a plurality of candidate routes between an origin and destination, partitioning each of the candidate routes into a set of predefined route patterns, and determining an energy usage associated with each of the candidate routes based on the selected values and the set of predefined route patterns defining the candidate route. The method further includes identifying the candidate route having the minimum energy usage and providing output describing the route having the minimum energy usage.

U.S. Pat. No. 8,615,344 discloses a method, a system and a program product for monitoring the rate of deflation or inflation in vehicular tires to determine the time or distance it takes before the tire pressure of one or more tires enters an undesirable state. Tire specifications, environmental modifiers, vehicular modifiers, road and weather conditions, and current tire pressure for each tire are recorded as input to provide an alert with a route plan for a driver to bring a vehicle to a service station before tire pressure reaches an undesirable condition. In one embodiment, the system can inform the driver at what time in the future a tire will reach an undesirable condition. In another embodiment, the system can inform the driver at what distance (measured in miles, for example) a tire will reach an undesirable condition. In yet another embodiment, the system can modify a route in order to avoid an unsafe tire condition.

U.S. Pat. No. 5,913,917 discloses a method and apparatus for prediction or estimation of fuel or energy consumption by a vehicle over a chosen trip route, where the route includes a plurality of road segments. Fuel consumption over each road segment is estimated, using information on one or more of the following variables: representative altitude of the road segment; representative slope of the road segment; estimated vehicle average speed along the road segment; length of the road segment; condition of the road segment; condition of the vehicle tires; expected vehicle traffic density along the road segment; applicable constraints on vehicle operation along the road segment; expected ambient weather conditions along the road segment; vehicle accessories that will be used; and vehicle driver profile information. Weather conditions enroute, such as local wind speed and direction, can be measured and used to enhance accuracy of predicted fuel consumption. Fuel consumption can be estimated initially, can be re-estimated enroute, using actual fuel consumption for the portion of the route already traveled, and can be estimated for a return trip along the same route. Fuel consumption can be estimated where the route is not initially specified. The fuel consumed may be electrical charge, gasoline, kerosene, natural gas, diesel fuel, or any similar fuel.

SUMMARY

The Applicant has realized that travel distance and travel time are not the only route characteristics useful for discriminating different possible alternative routes for going from an origin to a destination.

The Applicant has realized that there are other route characteristics that may be as important as, or, in some cases, even more import than travel distance and travel time.

An example of a route characteristic different from travel distance and travel time that may be of importance in deciding which route to take, among different possible alternative routes, is the presence of uphills and/or downhills along a route, and the uphills/downhills gradients. Another example of a route characteristic different from travel distance and travel time that may be of importance in deciding which route to take, among different possible alternative routes, is the degree of winding (number and type of curves) of a certain route.

The Applicant has realized that the actual weight of the vehicle is an important parameter to take into account when performing the selection of the best route. For example, it may be useful to discourage the driver of a heavily loaded vehicle from taking a route with substantial winding (a degree of curves higher than a predetermined value) or a route with substantial uphills/downhills (or a degree of up and down routing higher than a predetermined value). Preferably, among a plurality of routes, associated with different respective degrees of winding and/or up/down routing, the selection will be for the one associated with the lowest degree of windings and/or up/down routing.

On the other hand, the vehicle weight is not a predetermined quantity. For example, a car has a certain empty weight, which is known, but the weight changes substantially when the car is loaded, by the driver and one, two or more passengers, possibly with luggage in the trunk and/or in a luggage rack. Even more pronounced load variations are experienced by commercial vehicles, destined to the transportation of goods.

An accurate estimation of the actual vehicle weight is thus of great importance in order to be able to decide which, among different possible alternative routes, is the best route to take.

The Applicant has faced the problem of determining a vehicle route between an origin and a destination, based on an accurate estimation of the actual vehicle weight, thereby taking into account the fact that the vehicle load is variable.

The Applicant has observed that information derived by the vehicle's tires (hereafter also referred to as "tire-related information") can be useful to estimate the actual vehicle weight.

Tire monitoring units are known which, when placed within the tires, have the task of detecting tire's characteristic values, so as to allow substantially real-time monitoring and control of the operation and conditions of the tire.

Usually, tire monitoring units periodically dialogue with devices on board the vehicles, so that all the detected information can be provided to the driver and/or vehicle control systems, to, for example, activate or adjust to the best alarm systems and/or vehicle dynamics control, braking, etc.

Tire monitoring units typically comprise an electronic unit and a securing device for securing the electronic unit inside the tire. The electronic unit comprises at least one sensor (for example a temperature sensor, a pressure sensor, an accelerometer, a strain gauge, a piezoelectric sensor etc.) and a transmission system for sending the data detected by said at least one sensor to a receiving unit located on the vehicle. The electronic unit typically comprises a processing unit.

A parameter that can be monitored during tire rolling is the length of the contact area (so-called "patch") between the tire and the rolling surface (e.g., the road surface). The length of the contact area can also be ultimately related to other parameters related to tires, such as for example the load exerted on the tire by the vehicle, which is related to the vehicle weight.

The Applicant has thus observed that the length of the tire contact area with the rolling surface is a promising source of information for estimating the vehicle weight.

However, estimating the length of the tire contact area is one of the most challenging tasks, since it requires tire monitoring units with a sophisticated hardware comprising a sensor able to detect the tire's deformations during rolling, such as for example a sensor being able to measure radial acceleration or other physical quantity descriptive of the tire deformation during rolling.

A sensor able to detect the tire's deformations needs to be operated at a high sampling frequency, in order to properly reconstruct the profile (e.g., the acceleration profile) descriptive of the tire deformation over time. From such reconstructed profile, the length of the tire contact area can be identified (e.g., by measuring the width of relevant peaks and/or valleys in the profile), and its length can be estimated.

However, in the perception of the Applicant, when real time monitoring is considered, carried out at a typical, average running speed or at a high speed, it has to be taken into account that the monitoring unit attached to the tire is caused to pass in correspondence of the tire contact area many times per second. For example, at 50 km/h a tire rotates at about 7 turns/s, i.e., seven tire roundtrips per second.

Furthermore, in the perception of the Applicant, the length of the tire contact area represents on average only a small portion (3% to 15%) of the tire circumference, so that the tire monitoring unit remains in correspondence of the tire contact area for a very small amount of time over a tire roundtrip. The Applicant further considered that entering and exiting from the tire contact area is a very abrupt transition which generates sharp variations in the signal sensed by the sensor, further increasing the need of a very high sampling frequency, of the order of some KHz, e.g., 5 KHz, in order to precisely identify the start and the end of the portion of the measured profile corresponding to the tire contact area. Lower sampling frequencies, e.g., 2 kHz, leads to a progressive decrease of the precision since a high frequency measurement is substantially a direct measurement of the length of the tire contact area relying upon a precise tracking of the tire monitoring unit during its passage in the tire contact area itself. Further sampling frequency reduction will eventually hinder the possibility of using a direct measurement of the length of the tire contact area since too few sampling points will be available for a precise tire monitoring unit tracking in the contact area, i.e., for the reconstruction of the peaks/valleys representing the passage of the tire monitoring unit in the contact area.

The above would generate the need to use sophisticated and expensive tire monitoring units comprising sensors and related electronic control units which are driven and operated at a very high sampling frequency (i.e., at sampling frequency high enough to properly reconstruct the signal generated by the sensor) implies high power needs and consumption. Moreover, it would also create the need of transmitting a huge amount of data generated during sampling to an external (to the tire) control unit. Alternatively, the raw sensed data could be filtered and processed within the monitoring unit itself, but also in this case power consumption and hardware complexity would be increased.

On the other hand, in the Applicant perception, low power consumption is the most important aspect in making a viable tire monitoring unit. Practically, a tire monitoring unit mounted inside a tire can only be powered by a battery. In fact, despite of energy-scavenging solutions having been proposed, the battery is and will remain the main source of power of a tire monitoring unit. Replacing an exhausted battery is not feasible: the battery is required to last at least as long as the tire normal operating lifetime.

The Applicant has observed that relatively low-cost, cheap tire monitoring units are currently available on the market that generally comprise temperature and/or pressure sensors and an accelerometer or other inertial sensor, whose output signal is only used to trigger the temperature and/or pressure measurements when the tire starts to rotate, so as to save power when the vehicle is at rest (e.g., during parking). Since the tire pressure or the tire temperature do not need to be measured at high frequency, such sensors are typically operated at low sampling frequency in order to save power.

That is, the output signal of the accelerometer (or other inertial sensor) of such cheap tire temperature and/or pressure monitoring units is only used to trigger the temperature and/or pressure measurements when the tire starts to rotate.

By observing the output signal of the accelerometer (or other inertial sensor) of such cheap tire temperature and/or pressure monitoring units for a number of tire roundtrips, the Applicant wondered whether such output signal could be put in relation with a measure of the contact area of the tire with the rolling surface.

Reference is made to FIG. 1, which is a plot of an exemplary output of the radial acceleration values measured with the above-mentioned kind of low-cost sensors. Three consecutive tire roundtrips of a tire fitted on a vehicle have been tracked at a vehicle speed of 80 km/h. The plot of FIG. 1 was obtained with a sampling frequency of the output signal of the accelerometer (radial acceleration) of 250 Hz (i.e., twenty times smaller than the 5 kHz sampling frequency mentioned in the foregoing, necessary for reconstructing rather precisely the acceleration profile).

It can be seen that the resulting acceleration profile depicted in FIG. 1 shows very few sampling points by which it is impossible to perform a precise tracking of the tire monitoring unit in its approaching, entering, remaining in correspondence of, and exiting the tire contact area.

In other words, from an undersampled profile of the type shown in FIG. 1 it is impossible to determine the length of the tire contact area.

However, the Applicant noticed that even in such undersampled acceleration profile, some information still remains related to the passage of the tire monitoring unit in correspondence of the tire contact area: in the particular example shown in FIG. 1, samples whose value lay in proximity of, or relatively close to, zero radial acceleration can be considered as being representative of the fact that the tire monitoring unit is in correspondence of the tire contact area with the rolling surface at that sampling time (it should be kept in mind that while the tire monitoring unit remains in correspondence of the tire contact area, the radial acceleration is substantially zero, since the tire monitoring unit is locally moving on a substantially rectilinear path).

The Applicant understood that such very partial information regarding the tire monitoring unit passing in correspondence of the tire contact area, which is unusable over a single or few tire roundtrips, could be used for performing a monitoring based on a statistical analysis made on measurements carried out over a sufficiently high number of tire roundtrips during tire rolling.

To illustrate further this Applicant's intuition, reference in now made to FIG. 2 wherein the output signal of the accelerometer (radial acceleration) is plot versus time: in this case the graph shows the results of a measurement of the radial acceleration being carried out for about 5 seconds, i.e., a time frame fifteen times longer than in the previously discussed example of FIG. 1, in order to include a sufficiently high number of tire roundtrips.

For the sake of a good comparison, as in the previous example the vehicle speed has been set to 80 km/h and the sampling frequency the accelerometer output signal is 250 Hz as in the example of FIG. 1.

Differently from FIG. 1, in FIG. 2 it is possible to distinguish a clearer pattern, or a distribution, of sampling points. In particular it can be noticed that a first group of sampling points lays in proximity of, or relatively close to, zero radial acceleration; these sampling points can be considered as being representative of passages of the tire monitoring unit in correspondence of the tire contact area at the respective sampling times. On the other hand, all the remaining sampling points can be considered as being representative of the tire monitoring unit being outside the tire contact area at the respective sampling times.

By looking at graphs like the one shown in FIG. 2, the Applicant has appreciated that even from an undersampled acceleration signal (or other signal of a measured physical quantity representative of tire deformation) it is possible to extract, from the overall measurements, data representing passages of the tire monitoring unit in correspondence of the tire contact area.

The Applicant further perceived that by counting the number of passages (of the tire monitoring unit in correspondence of the tire contact area) in a certain amount of time, the probability of finding the tire monitoring unit in correspondence of the tire contact area at a certain time during tire rolling could be estimated: the higher the value of said number of passages in said amount of time, the higher the time spent by the tire monitoring unit in correspondence of the tire contact area within said amount of time, and consequently the higher the probability of finding the tire monitoring unit in correspondence of the tire contact area at a certain time during tire rolling.

In the perception of the Applicant, such probability can be calculated as the ratio between the number of detected passages in said amount of time and an overall number of measurements within said amount of time at the sampling frequency, or as an alternative, such probability can be calculated as the ratio between the cumulated time associated with the detected passages (i.e., the number of detected passages multiplied by the sampling period or the inverse of the sampling frequency) and said amount of time.

The above perception led the Applicant to adopting a statistical approach for the estimation of the length of the tire contact area (or of other parameters related to it), based on the fact that the higher the probability of finding the tire monitoring unit in correspondence of the tire contact area at a certain time during tire rolling, the higher the value of the length of the tire contact area relative to the length of the whole tire circumference.

For example, the Applicant perceived that the length PL of the tire contact area ("patch length") could be estimated based on the tire circumference and on the probability p of finding the tire monitoring unit in correspondence of the tire contact area at a certain time during tire rolling, by using the formula $PL=2\pi Rp$, wherein R is a radius (e.g., a rolling radius) of the tire.

The Applicant surprisingly found that such statistical approach leads to a very precise estimation of the length of the tire contact area, and/or of other parameters related to tires, such as the load exerted by the vehicle on the tires. From this, the actual vehicle weight can be accurately estimated.

By using such a statistical approach, the Applicant hence found that it is advantageously possible to perform a real-time or substantially real-time tire monitoring using low-cost monitoring units operated at low frequency and with low power needs, without the need of providing complex hardware and software adapted for reconstructing a signal descriptive of the tire deformations and/or for recognizing the start and the end of peaks or valleys or other significant points of such signal.

From said real-time or substantially real-time tire monitoring, information about the actual load exerted by the vehicle on the tires can be derived, and thus the actual vehicle weight can be accurately estimated. The estimated vehicle weight is then exploited in making a selection among different possible routes for going from an origin to a destination.

According to an aspect of the present disclosure, a method is proposed for determining a route for a vehicle. The method includes:
  a) associating a navigation module to a vehicle fitted with tires;
  b) associating a tire monitoring unit to at least one tire fitted to such vehicle, said tire monitoring unit including at least one sensing element adapted to generate a sensing signal descriptive of deformations undergone by said tire during rotation on a rolling surface, said deformations forming a contact area between said tire and said rolling surface;
  c) during the rotation of such at least one tire of the vehicle fitted with such monitoring unit, undersampling said sensing signal generated by said sensing element including the sensing signal generated in correspondence of passages of said sensing element through said contact area for a number of said passages sufficient for obtaining an estimated length of said contact area based on said undersampled sensing signal;

d) estimating the weight of the vehicle based on such estimated length, e) identifying at least two alternative routes; and f) selecting at least one route among said at least alternative routes based on such estimated weight of the vehicle.

In another aspect, the present disclosure refers to a system for selecting a route for a vehicle fitted with tires, the system including a navigation module, a tire monitoring unit associated with at least one of said fitted tires, said tire monitoring unit comprising at least one sensing element adapted to generate a sensing signal descriptive of deformations undergone by said tire during rotation on a rolling surface, said deformations forming a contact area between said tire and said rolling surface, wherein the system further includes at least one processing unit including software modules being adapted to:

a) during the rotation of such at least one tire of the vehicle associated with such monitoring unit, undersampling said sensing signal generated by said sensing element including the sensing signal generated in correspondence of passages of said sensing element through said contact area for a number of said passages sufficient for obtaining an estimated length of said contact area based on said undersampled sensing signal;

b) estimating the weight of the vehicle based on such estimated length, c) identifying at least two alternative routes; and d) selecting at least one route among said at least two alternative routes based on such estimated weight of the vehicle.

For the purposes of the present disclosure, "undersampling" the sensing signal (generated by the sensing element, including the sensing signal generated in correspondence of passages of the sensing element through the contact area) means detecting "few points" corresponding to the passage of the sensing element through the contact area, wherein by detecting "few points" it is meant that the number of detected points is not per-se sufficient to reconstruct, not even approximately, a curve being descriptive of a signal representing an acceleration profile. Preferably, "few points" means from at least 0.5 points on average per tire roundtrip representative of the sensing element being in correspondence of the tire contact area to at most 5 points representative of the sensing element being in correspondence of the tire contact area on average per tire roundtrip. More preferably, "few points" means from at least 0.8 points on average per tire roundtrip representative of the sensing element being in correspondence of the tire contact area to 4 points representative of the sensing element being in correspondence of the tire contact area on average per tire roundtrip.

In other words, "undersampling" the sensing signal (generated by the sensing element, including the sensing signal generated in correspondence of passages of the sensing element through the contact area) means sampling the sensing signal at a sampling frequency such that, in a predetermined range of tire rotation speeds, the number of samples per tire roundtrip is not per-se sufficient to reconstruct, not even approximately, a curve being descriptive of a signal representing an acceleration profile. For example, a range of sampling frequency from 50 Hz to 1.5 KHz for a vehicle speed from 40 Km/h to 100 Km/h produces an undersampled sensing signal.

The "number of said passages sufficient for obtaining an estimated length of said contact area based on said undersampled sensing signal" is a number of passages sufficiently high to enable a statistical processing (statistical analysis) of the undersampled sensing signal.

At vehicle speeds in the range of 40 km/h-100 km/h, a sampling frequency in the range from 50 Hz to 1.5 KHz enables performing a statistical analysis of the undersampled sensing signal in a fair amount of time.

In preferred embodiments, the sampling frequency is higher than about 150 Hz and lower than about 750 Hz. More preferably the sampling frequency is comprised in the range 150 H-600 Hz.

The lower the sampling frequency, the lower the tire monitoring unit power consumption; preferred sampling frequency ranges may be selected in order to ensure that at least one sampling point representative of a passage of the tire monitoring unit in correspondence of the tire contact area is, on average, present in the acceleration measurement at least every two tire roundtrips (i.e., 0.5 points on average per tire roundtrip) for typical vehicle speeds, e.g., for a vehicle speed up to 100 km/h.

More preferably, sampling frequency ranges may be selected in order to ensure that at least an average of 0.8 sampling points representative of passages of the tire monitoring unit in correspondence of the tire contact area are present in the acceleration measurement per tire roundtrip, for typical vehicle speeds, e.g., for a vehicle speed up to 100 km/h.

Even more preferably, sampling frequency ranges may be selected in order to ensure that at least an average of one sampling point representative of a passage of the tire monitoring unit in correspondence of the tire contact area is present in the acceleration measurement per tire roundtrip, for typical vehicle speeds, e.g., for a vehicle speed up to 100 km/h.

For each sample of said undersampled sensing signal, it can be determined whether the sample has a value (e.g., acceleration value) representative of a passage of said sensing element in correspondence of said contact area, so as to obtain a first number indicating how many times the sensing element has passed in correspondence of the tire contact area within an amount of time corresponding to said number of said passages.

In an embodiment, a set of samples of the undersampled sensing signal representative of passages of said sensing element in correspondence of the tire contact area can be extracted from a sequence of samples of the undersampled sensing signal, so as to obtain the above mentioned first number.

To obtain the first number, said sequence of samples can be either processed (with suitable software/firmware modules) within the tire monitoring unit or transmitted to a controlling unit external to the tire to which the tire monitoring unit is associated/secured.

Preferably, an overall number of samples of the undersampled sensing signal can be determined, based on the sampling frequency and said amount of time.

In particular, said overall number of samples can be obtained as the product of said sampling frequency and said amount of time. In this way memory of the tire monitoring unit and/or calculation time can be saved.

The estimation of the length of the tire contact area may be performed based on said first number of samples and said overall number of samples (e.g., based on the ratio of the first number of samples and the overall number of samples).

The Applicant has also found that power consumption of the tire monitoring unit can be further optimized by interrupting the undersampling of the sensing signal during a switch off time so as to further decrease power consumption and increase battery lifetime.

This is feasible by determining a second number of "virtual" samples of the sensing signal, that should be performed during said switch off time, but that are actually not performed, which can be estimated based on the sampling frequency and the switch off time, for example as the product of the sampling frequency and said switch off time.

The overall number of samples can be thus composed by the sum of a number of actual samples (including the first number of samples) and said second number of virtual samples.

The duration of the switch off time is lower than the amount of time corresponding to said number of said passages and may be selected in such a way as an actual sampling of the sensing signal performed during the switch off time would include only samples representative of the passage of the tire monitoring unit outside the tire contact area. In this way, since such "virtual" samples do not contribute to the first number and can be determined based on the sampling frequency and the duration of the switch off time, their actual obtainment can be avoided, so as to save power.

Preferably said switch off time can be set in the range between one third and three quarters of the roundtrip time.

In preferred embodiments, the undersampling of the sensing signal can be interrupted after at least one sample of the sensing signal is obtained which is related to a passage of the tire monitoring unit in correspondence of the tire contact area.

The undersampling of the sensing signal is then started again after the switch off time. In a more preferred embodiment, the interruption of the undersampling of the sensing signal may be triggered by the occurrence of a sample representative of a passage of the tire monitoring unit in correspondence of the tire contact area and a consecutive sample representative of a passage of the tire monitoring unit outside the tire contact area. In this way the chances of including samples representative of passages of the tire monitoring unit in correspondence of the tire contact area within said switch off time are reduced.

In another preferred embodiment said switch off time can be adjusted in response to variations of a rotation speed of said tire. In this way power consumption can be further optimized and the chances of including samples representative of passages of the tire monitoring unit in correspondence of the tire contact area within said switch off time can be further reduced.

The variation of the tire rotation speed can be communicated to the tire monitoring unit by a controlling unit external to the tire or can be detected by the tire monitoring unit itself, for example based on the time difference between two consecutive passages of the tire monitoring unit in correspondence of the tire contact area.

In preferred embodiments, the determination of whether a sample of the sensing signal has a value representative of a passage of the tire monitoring unit in correspondence of the tire contact area is performed by defining a threshold value and comparing the value of said sample with said threshold value.

For example, in the case of a radial acceleration profile the threshold value can be set as $V^2/(2R)$, wherein V is the vehicle speed and R is a tire radius. In other words, it is possible to consider as representative of the tire monitoring unit passage in correspondence of the tire contact area only those samples whose absolute value of radial acceleration is lower than one half of the centripetal/centrifugal acceleration to which the tire monitoring unit is subjected during rotation outside the tire contact area.

It is understood that if other quantities descriptive of the tire deformation are used instead of radial acceleration, threshold value and comparison criteria (value lower or higher than the threshold) can vary accordingly.

In a further preferred embodiment the threshold can be set to an initial value before starting the undersampling of the sensing signal, and then it can be adjusted, for example in response to variations of the rotation speed of the tire.

Threshold adaptation with tire rotational speed allows reducing occurrence of possible errors in determining whether a sample is representative of a passage of the tire monitoring unit in correspondence of the tire contact area, ultimately increasing the precision and the accuracy of the estimation of the parameters related to the tires.

For example, when said measured quantity is the radial acceleration, the absolute value of said threshold is increased upon tire rotational speed increasing and vice versa.

In a further preferred embodiment, at least the initial value of the threshold is communicated to the tire monitoring unit from a controlling unit external to said tire.

This is particularly convenient for those tire monitoring units with a low degree of hardware complexity comprising a minimal amount of hardware. In such cases, part of the processing can be carried out in a processing unit of the controlling unit external to said tire, to which data are transmitted.

In another preferred embodiment the controlling unit communicates not only the initial value of the threshold but also the subsequent values of said threshold, adjusted in response to variation of tire rotation speed.

In preferred embodiments, the tire monitoring unit is secured to a crown portion of said tire, more preferably to an inner surface of the tire.

In preferred embodiments, the at least one sensing element is adapted to measure at least a radial acceleration of said crown portion during rotation of said tire.

Securing the tire monitoring unit to a crown portion of a tire, close to, or even embedded in, the tire tread, is advantageous since it is easier to measure a quantity descriptive of tire deformations, and thus more precisely identifying the occurrences of passages of the tire monitoring unit in correspondence of the tire contact area.

As previously noticed, among tire's parameter to be monitored during tire rolling, the length of the tire contact area is one of the most challenging to be estimated and at the same time is one of the most useful since it may be used in the determination of other tire related parameters, such as the load exerted by the vehicle on a tire, from which the overall vehicle weight can be dynamically estimated. The dynamic estimation of the vehicle weight can then be used to select the vehicle route.

The Applicant has found that the first number and the overall number of samples (or other number describing the whole statistic set of measurements derivable from the sampling frequency and the amount of time) can be directly used to estimate the probability of finding the tire monitoring unit in correspondence of the tire contact area. A length of the tire contact area can be estimated based on those numbers, for example as the product of the tire circumference and the ratio between said first number and said overall number of samples.

It could be convenient to include tire pressure and/or tire temperature sensing elements within the monitoring unit. This minimizes hardware complexity and/or eliminates the need of communication between a plurality of tire monitoring units secured to different portions of the tire or to the wheel.

Tire pressure together with the estimated length of the tire contact area can advantageously be used to estimate tire load. For example, the load Fz exerted by the vehicle on the tire can be calculated from the estimated length of the tire contact area based on a polynomial fitting function of the tire contact area length, e.g. by using the following formula i) or formula below:

$$Fz = A(P) + B(P)*PL \qquad \text{i)}$$

$$Fz = A(P) + B(P)*PL + C(P)*PL2 \qquad \text{ii)}$$

wherein P is the tire pressure, PL is the length of the tire contact area and A, B, C are calibration parameters depending on the tire pressure P, whose values can be obtained by a calibration performed for the tire model to which the tire monitoring unit is to be associated. Calibration can be performed by using conventional testing machines on which a tire inflated at a controlled pressure and temperature is rotated over a conveyor belt under controlled conditions of exerted load and rotation speed.

In a more preferred embodiment, the load Fz exerted by the vehicle on the tire can be more precisely calculated from the estimated tire contact area length based on a polynomial function of the tire contact area length wherein the coefficients of said polynomial function further depend on tire pressure, temperature and rotation speed, e.g., according to the following formula iii) or formula v) below:

$$Fz = A(P,\omega,T) + B(P,\omega,T)*PL \qquad \text{iii)}$$

$$Fz = A(P,\omega,T) + B(P,\omega,T)*PL + C(P,\omega,T)*PL2 \qquad \text{iv)}$$

wherein P is the tire pressure, T is the tire temperature, PL is the length of the tire contact area, $\omega$ is the tire rotational speed and $A(P,\omega,T)$, $B(P,\omega,T)$, $C(P,\omega,T)$ are calibration parameters depending on the tire pressure, tire rotation speed and tire temperature.

The Applicant has further noticed that the present disclosure leads to a more precise outcome if it is carried out in a way that during the measurement the kinematic and/or dynamic conditions acting on a tire do not undergo a substantial variation, i.e., in linear or quasi linear running conditions.

In preferred embodiments, the undersampling of the sensing signal is started when at least one of the following access conditions is met:
  a speed of the vehicle is comprised within a predetermined speed range, preferably within about 40 km/h and about 100 km/h, more preferably within about 60 km/h and about 80 km/h,
  an absolute value of longitudinal acceleration (i.e., the acceleration in the same direction of motion of the vehicle) of the vehicle is lower than a predetermined amount, preferably below about 0.3 m/s$^2$.

In more preferred embodiments, a further access condition to be met may be provided, by which an absolute value of lateral acceleration (i.e., the acceleration in a direction perpendicular to the direction of motion of the vehicle) of the vehicle is lower than a predetermined amount, preferably below about 0.3 m/s$^2$.

As previously discussed, the present disclosure relies on the accumulation of a statistical set of samples obtained over a sufficiently high number of tire roundtrips performed by the tire during rolling in an amount of time.

In preferred embodiments, the present disclosure further comprises stopping the undersampling of the sensing signal when said amount of time exceeds a predetermined maximum amount of time. Preferably said maximum amount of time may be comprised between about 5 seconds and about 30 seconds, more preferably said maximum amount of time is comprised between about 10 seconds and about 20 seconds.

It is thus worthy to notice that the present disclosure makes possible a real time or substantially real time estimation of the tire contact area length, and thus of the vehicle weight.

Further stopping conditions may be defined, for example to track that the kinematic or dynamic conditions are changing, or have changed, to an extent not compatible with the accuracy requested by the vehicle control system.

For example, in preferred embodiments, the present disclosure further comprises stopping the undersampling of the sensing signal when at least one of the following stopping conditions is met:
  an absolute value of longitudinal acceleration of the vehicle exceeds a predetermined acceleration threshold, preferably about 0.3 m/s2,
  a speed of the vehicle is outside a predetermined speed range, preferably below about 40 km/h or preferably above about 100 km/h.

A further stopping condition to be met may be provided, by which an absolute value of lateral acceleration of the vehicle is higher than a predetermined amount, preferably the absolute value of lateral acceleration of said vehicle is higher than about 0.3 m/s$^2$.

In further embodiments, one or more of the above stopping conditions may be used to discard at least one subset of the sensing signal samples. For example, the samples can be taken by the tire monitoring unit in a predefined amount of time, and if it is evaluated that during said predefined amount of time one or more of the above stopping conditions have been met, the whole set of samples is discarded and the tire contact area length is not estimated.

The tire monitoring unit advantageously comprises a transmitting and/or a receiving section to communicate with a controlling unit external to said tire. The samples of the sensing signal and/or the estimated tire contact area length can be communicated by the tire monitoring unit to the controlling unit. Those data may be then be exploited to estimate the vehicle weight and to select a route.

BRIEF DESCRIPTION OF THE DRAWINGS

The above-mentioned features and advantages of the present disclosure, as well as other features and advantages, will be made apparent by the following detailed description of exemplary and non-limitative embodiments thereof. In the following description, reference will be made to the annexed drawings, wherein.

DETAILED DESCRIPTION

Figure 1:
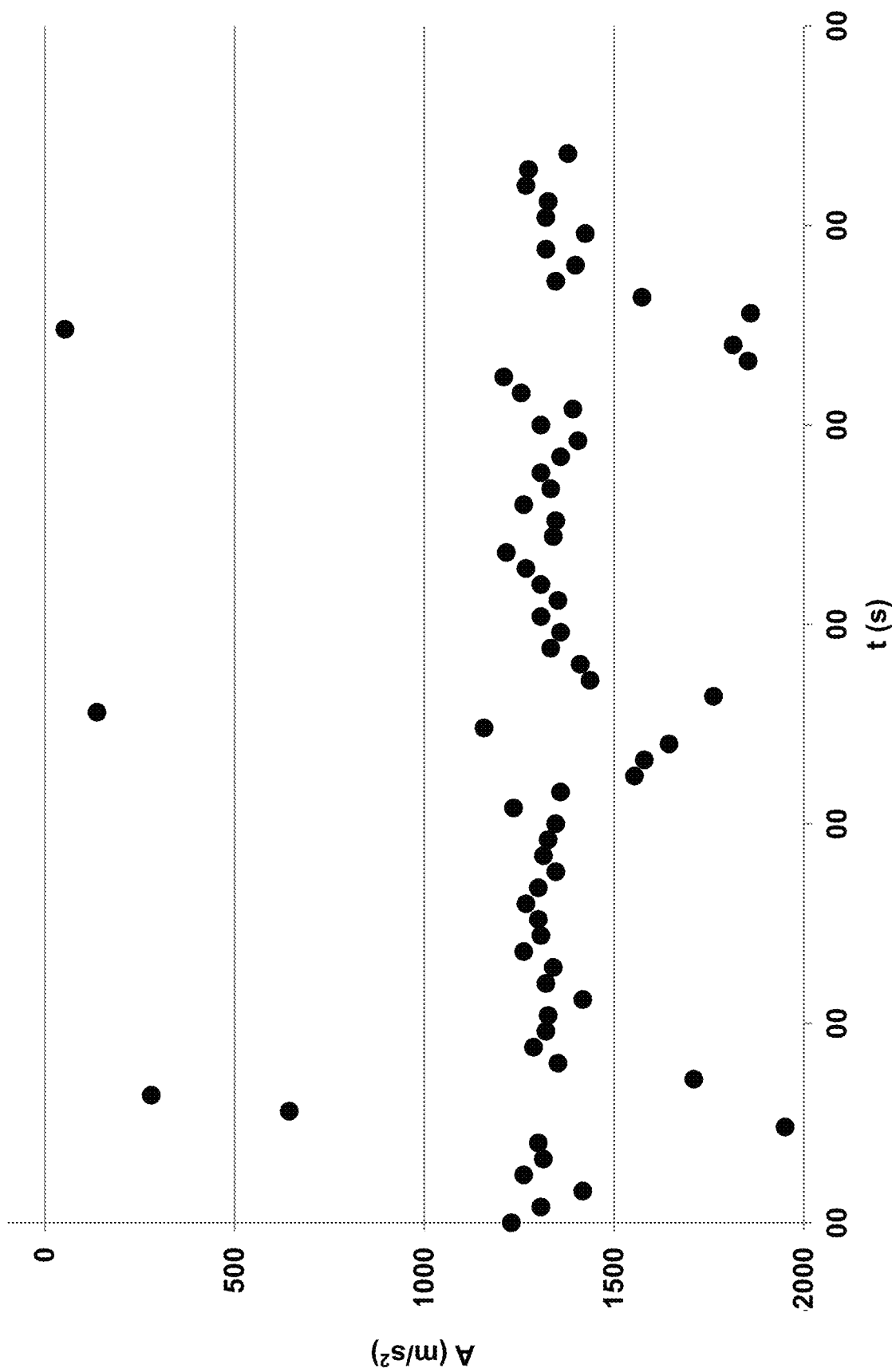
FIG. 1, already discussed in the foregoing, shows radial acceleration versus time for three consecutive tire round trips measured at 250 Hz sampling frequency.
Figure 2:
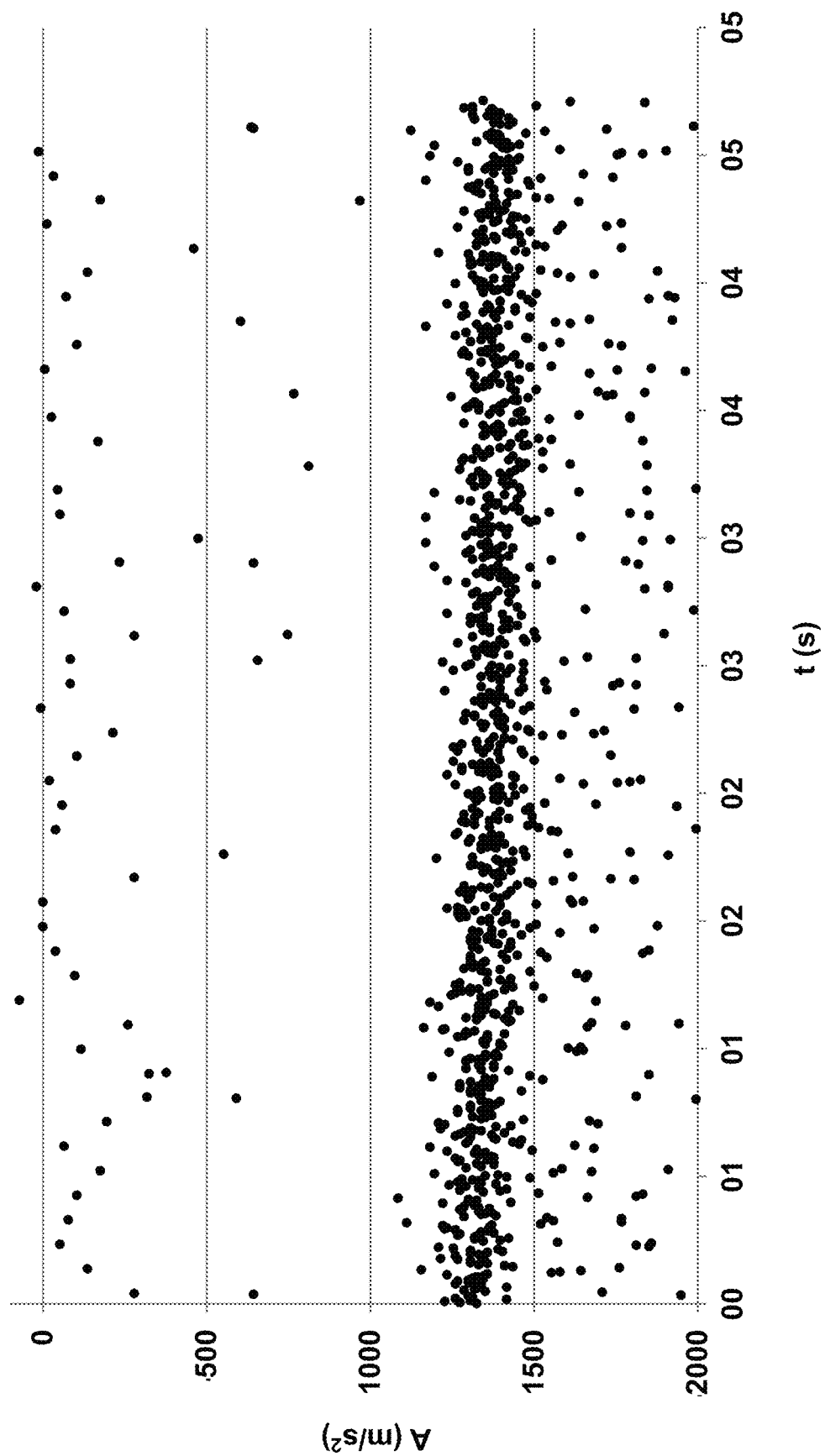
FIG. 2, already discussed in the foregoing, shows radial acceleration versus time for a high number of consecutive tire round trips measured at 250 Hz sampling frequency.
Figure 3:
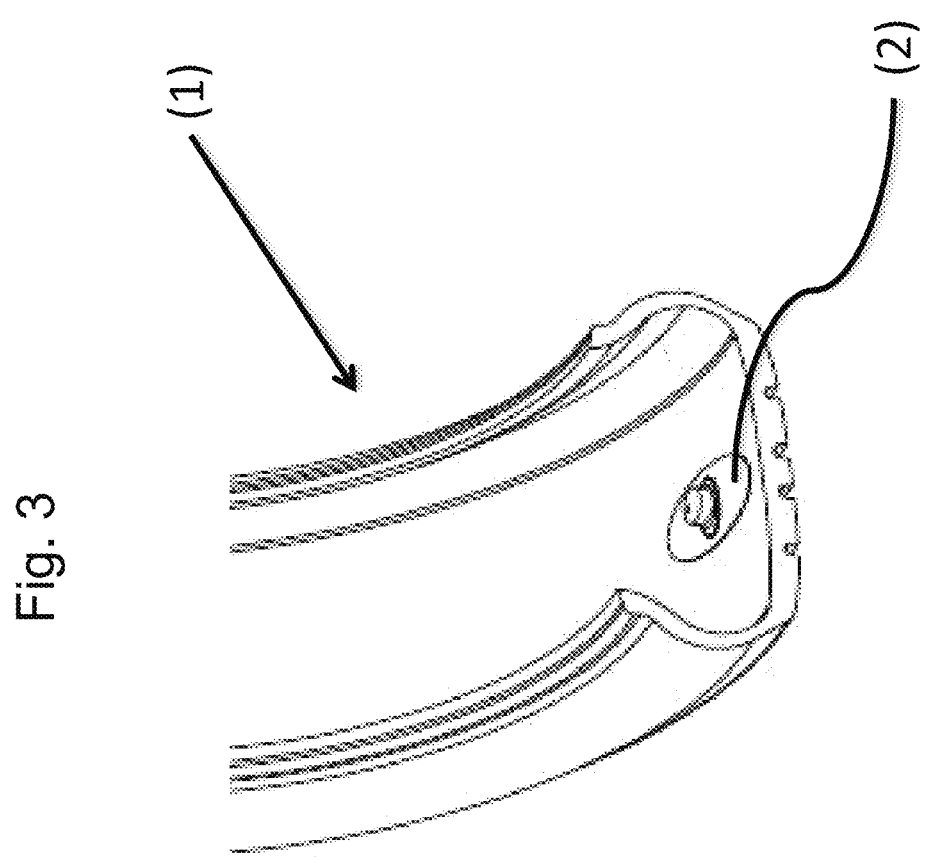
FIG. 3 shows a monitoring unit fitted into a tire.

Reference is made to FIG. 3 showing a portion of a tire (1) comprising a tire monitoring unit (2) adapted to work at low sampling frequency, e.g., a sampling frequency lower than 1-1.5 kHz.

The tire monitoring unit (2) is secured to a crown portion of the tire (1), preferably substantially in correspondence of the equatorial plane of the tire. In particular, the tire monitoring unit (2) may be glued or connected via an adhesive tape to the inner liner of the tire.

Figure 4:
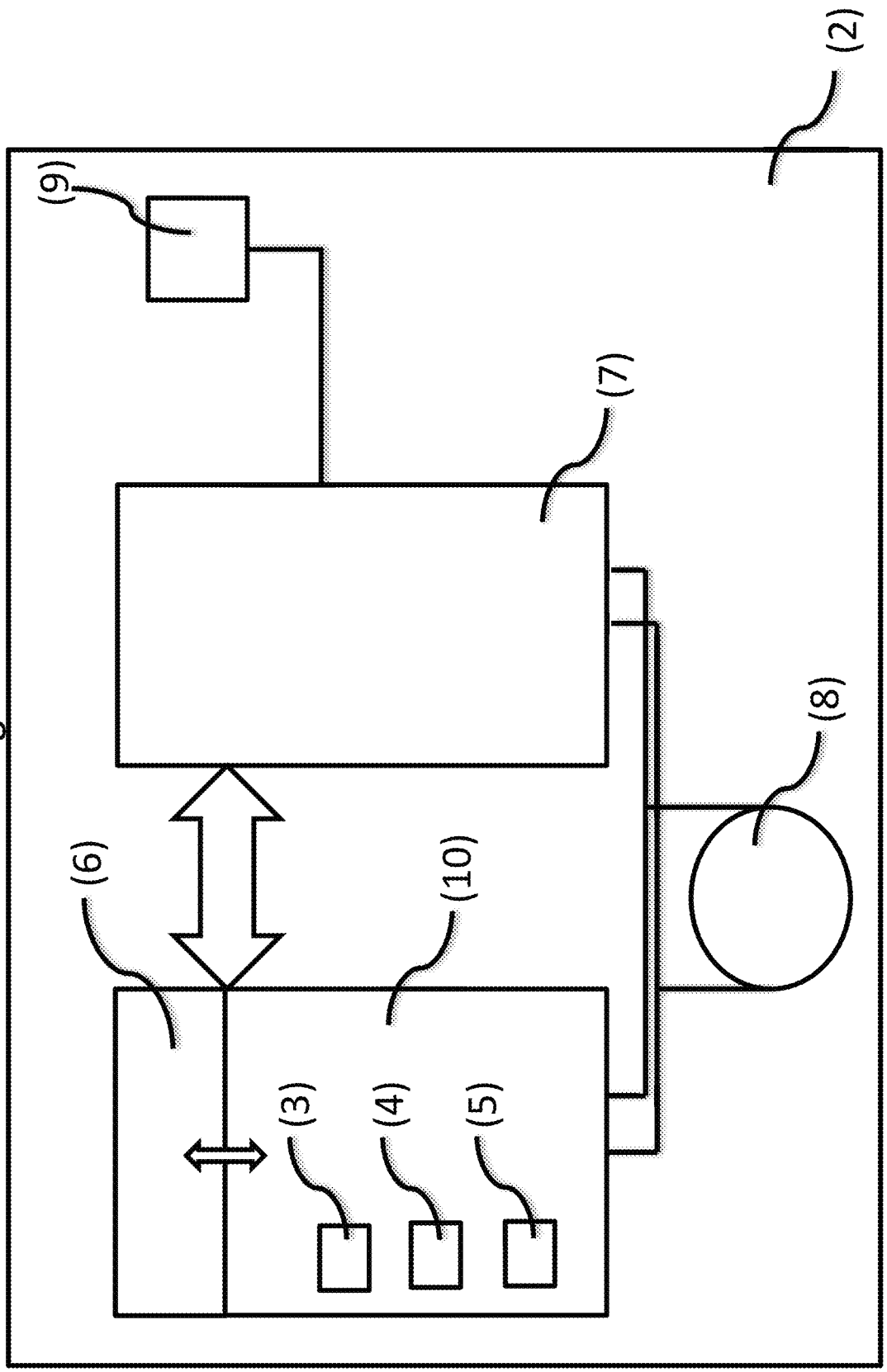
FIG. 4 shows a scheme of a monitoring unit according to an embodiment of the disclosure.

With reference to FIG. 4, the tire monitoring unit (2) comprises a sensing section (10), a battery (8), a processing unit (central processing unit or CPU) (6) associated with a memory, a transceiver (7), an antenna (9).

The sensing section (10) comprises a radial accelerometer (3) oriented within the monitoring unit (2) so as to have an axis substantially orthogonal to the inner surface of the tire. The radial accelerometer (3) is a sensing element configured to generate a sensing signal descriptive of deformations in radial direction which said tire (1) undergoes during rolling on a rolling surface (e.g., a road surface). Other sensing elements adapted for measuring physical quantities descriptive of tire deformations could be used, such as tangential accelerometers, lateral accelerometers, strain gauges, etc.

The sensing section (10) of said monitoring unit (2) further comprises a pressure sensor (4) and a temperature sensor (5) configured to output respectively a measurement of the pressure internal to the tire (1) and of the temperature of the tire (1).

The CPU (6) is configured, via suitable software/firmware modules, to receive, from the sensing section (10), the sensing signal generated by the radial accelerometer (3) and data related to the measurements performed by the temperature and pressure sensors (4, 5). The CPU (6) is also configured to sample the sensing signal generated by the radial accelerometer (3) at a sampling frequency, so as to obtain a sequence of samples of the sensing signal. The CPU (6) is further configured, via suitable software/firmware modules, to process the data received from said accelerometer and sensors (3, 4, 5) in order to estimate, from said data, tire-related parameters, particularly the length of the tire contact area and/or the load exerted on the tire by a vehicle to which the tire is fitted. Alternatively, the CPU (6) can be configured, via suitable software/firmware modules, to process said data up to a certain extent, i.e., to perform only part of the processing, and then to send the processing results to an external controlling unit, via the transceiver (7) and the antenna (9), to complete the processing up to the estimation of said tire-related parameters. The CPU (6) may be also configured, via suitable software/firmware modules, to receive access and/or stopping conditions from the external controlling unit. The access conditions may be used by the CPU (6) as a trigger to command the sensing section (10) to start the measurements needed for the estimation of the tire-related parameters, and/or to start the processing needed for the estimation of the tire-related parameters. The stopping conditions may be used by the CPU (6) as a trigger to stop or suspend the measurements performed by the sensing section (10), and/or to stop or suspend the processing needed for the estimation of the tire-related parameters.

The transceiver section (7) is configured for bidirectional communication via the RF antenna (9) with an external controlling unit specifically configured for communication with the tire monitoring units (2) comprised within the tires of a vehicle. Alternatively, the transceiver section (7) can directly communicate, via the RF antenna (9), with a vehicle control system, such as a vehicle board computer of the vehicle to which the tire is fitted. In preferred embodiments, the transceiver (7) comprises a Bluetooth Low Energy (BLE) module.

The battery (8) directly or indirectly feeds electrical power to the various components of the monitoring unit (2). In preferred embodiments, the battery can be a rechargeable battery, rechargeable with power scavenged from mechanical energy caused by tire rotation.

Figure 5:
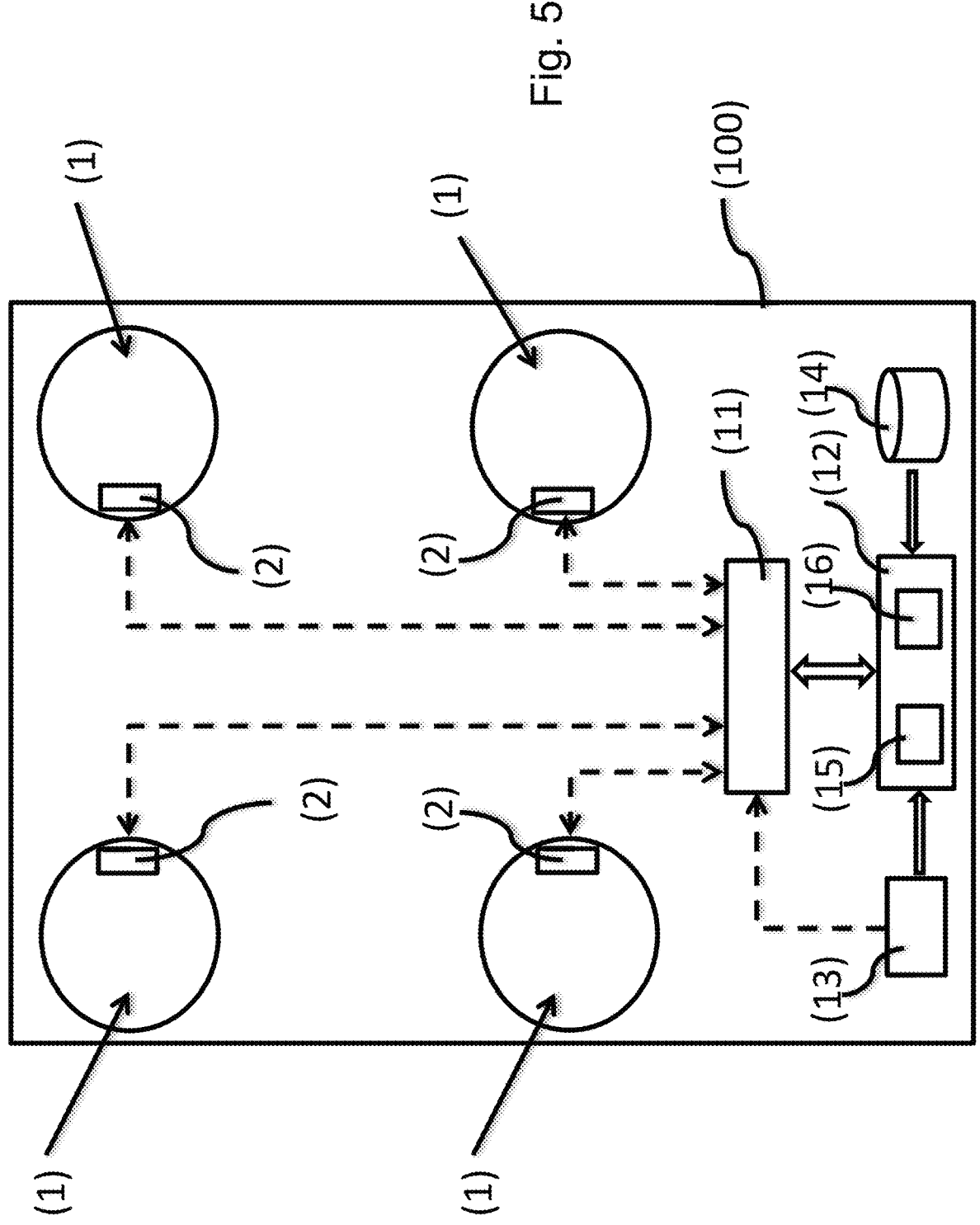
FIG. 5 shows a scheme of a vehicle comprising a tire monitoring system and a vehicle control system according to an embodiment of the disclosure.

FIG. 5 schematically shows an embodiment of a system for monitoring tires. The system is implemented in a vehicle (100) fitted with four tires (1), each of which comprising a respective tire monitoring unit (2). The vehicle (100) may be for example a car or a commercial vehicle like a van or a truck. However, the present disclosure applies in general to vehicles like two or three wheeler scoters, motorbikes, tractors, buses, trucks or light trucks, i.e., to vehicles with two, three, four, six or more wheels distributed on two or more axles. The vehicle (100) can be driven by electrical power or relying on thermal propulsion (internal combustion engine) or it can be a hybrid vehicle.

The tire monitoring units (2) in the tires (1) are in communication with a controlling unit (11). The controlling unit (11) is in communication with a vehicle control system (12). The vehicle control system (12) can be adjusted to send messages recommending the best route to select. The vehicle control system (12) is interfaced with a vehicle positioning system (13), for example a satellite positioning system like the GPS. In other embodiments, the vehicle positioning system (13) may be incorporated in the vehicle control system (12). The vehicle control system (12) is also interfaced with a database (14) storing roadway maps, possibly along with other data like traffic data and weather conditions data. The vehicle control system (12) includes a user interface (15) comprising for example user input means and a display (16); the user interface (15) can be a touch screen of the display (16). The vehicle control system (12) comprises a navigation module configured to provide (e.g., on the display (16)) navigation information, based on the vehicle position data received from the vehicle positioning system (13) and the roadway maps available in the database (14).

In particular, the vehicle control system (12) is configured for calculating and proposing to the vehicle's driver alternative routes for going from an origin to a destination. The origin and/or the destination can be inputted by the vehicle driver (or by any of the vehicle occupants) through the user interface (15). The vehicle control system (12) is configured to calculate and select the routes for going from the origin to the destination based on an estimation of the vehicle weight: the estimation of the vehicle weight is based on the estimated tire-related parameters, particularly the estimated length of the tire contact area and/or the estimated load exerted by the vehicle on the tires, estimated by the tire monitoring units (2) and/or by the controlling unit (11).

Typically, the communication between the tire monitoring units (2) and the controlling unit (11) is a wireless communication (e.g., a Bluetooth communication). The communication between the controlling unit (11) and the vehicle control system (12) can be wireless and/or wired (e.g., on a CAN BUS). In other preferred embodiments, the controlling unit (11) can be a hardware or software module implemented in the vehicle control system (12).

The controlling unit (11) is external with respect to the tires (1) wherein the tire monitoring units (2) are secured. The controlling unit (11) can be placed in any location inside the vehicle which can be reached by the wireless (e.g., Bluetooth) signal transmitted by the tire monitoring units (2).

For example, the controlling unit (11) can be a box attached to the vehicle windshield. In other embodiments, the controlling unit (11) can be a mobile personal device of the vehicle driver (e.g., a smartphone or a tablet), provided with suitable software applications/modules configured at least for communication with the tire monitoring units (2) and with the vehicle control system (12), as well as for processing data received from the tire monitoring units (2) and for providing processed data to the vehicle control system (12).

Figure 6:
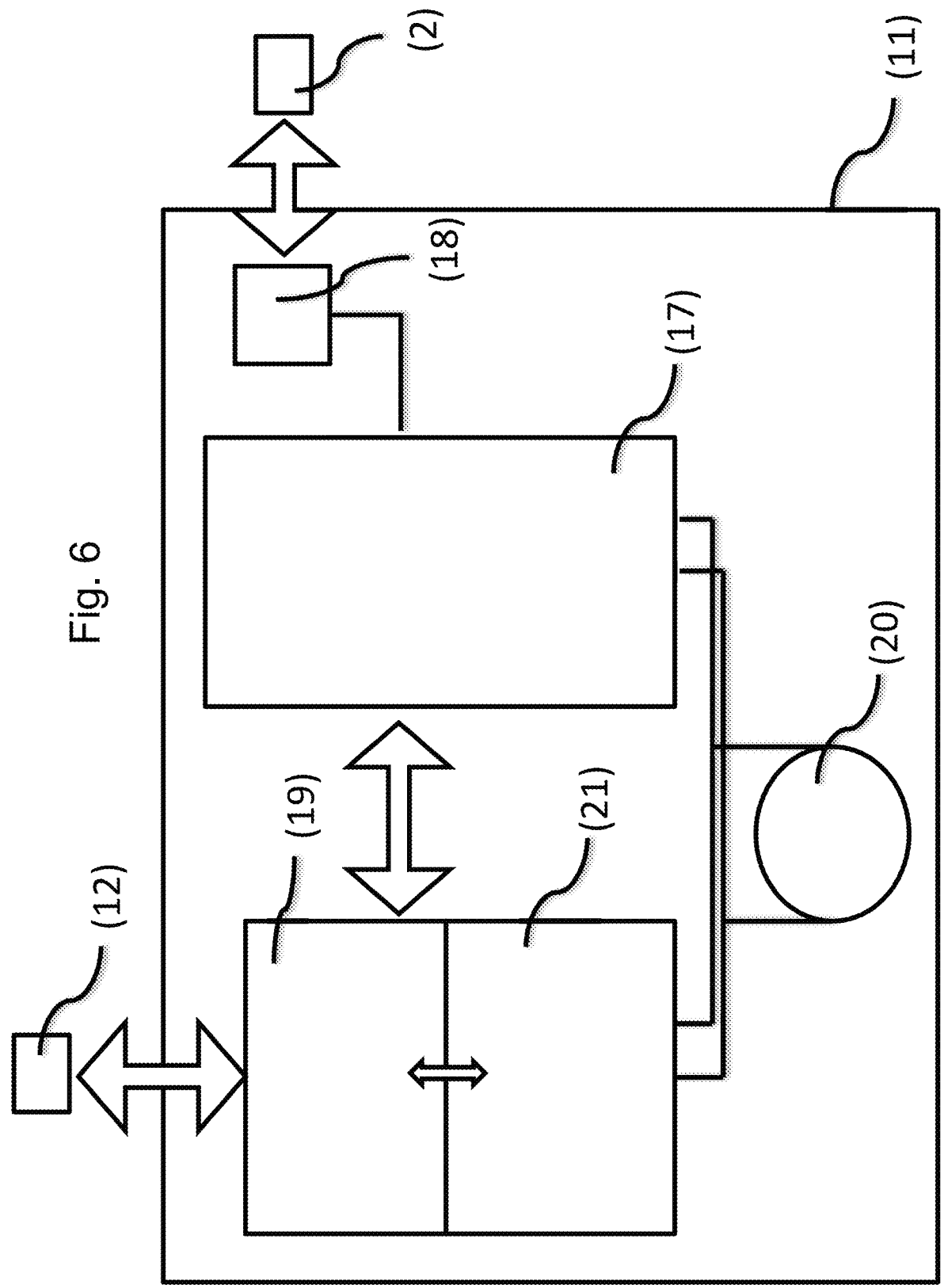
FIG. 6 shows a scheme of a controlling unit according to an embodiment of the disclosure, and FIG. 7 schematically shows an example of the main actions performed by the method and a system of the disclosure.

FIG. 6 schematically shows an embodiment of a controlling unit (11) suitable for the system for monitoring tires of FIG. 5. The controlling unit (11) comprises a transceiver section (17), an RF antenna (18), an interface (19) to the vehicle control system (12), a battery (20), a processing unit (21) associated with a memory. The controlling unit (11) may use data provided by an external positioning system, e.g. a GPS unit, for example a GPS unit on the vehicle (e.g., a GPS unit incorporated in the vehicle control system (12) or in the vehicle positioning system (13) provided in the vehicle) or in a mobile personal device of the vehicle driver, such as a smartphone or a tablet. In embodiments, the controlling unit (11) may also incorporate a satellite positioning system.

The transceiver section (17) of the controlling unit (11) is configured for bidirectional communication via the RF antenna (18) with the tire monitoring units (2). In preferred embodiments, the transceiver section (17) comprises a Bluetooth Low Energy (BLE) module.

The interface (19) can be a CAN BUS interface adapted for bidirectional communication with the vehicle control system (12).

The battery (20) directly or indirectly feeds electrical power to the various components of the controlling unit (11). In other embodiments, the controlling unit (11) can be powered by the vehicle battery, via the interface (19).

The processing unit (21) (e.g., a CPU) of the controlling unit (11) is configured, via suitable software/firmware modules, to receive data from the tire monitoring units (2) comprised within the tires. Such data may comprise tire-related parameters estimated by the tire monitoring units (2), particularly an estimated length of the tire contact area with the rolling surface and/or an estimated load exerted by the vehicle on the tires, or measurements performed by the tire monitoring units (2), or results of partial processing performed on said measurements by the tire monitoring units (2). The processing unit (21) is also configured, via suitable software/firmware modules, to process such data in order to estimate at least one tire-related parameter, particularly the length of the tire contact area and/or the load exerted by the vehicle on the tires. The processing unit (21) may be also configured, via suitable software/firmware modules, to monitor access and/or stopping conditions to be applied for triggering starting and/or stopping/suspending the estimation of the tire-related parameter(s), and/or possibly discarding those samples of the sensing signal taken during acquisitions occurred within time intervals in which those access conditions were not met.

Ultimately the choice of whether distributing the processing between the tire monitoring units (2) and the controlling unit (11) for the tire-related parameter estimation is a trade-off between several constraints to be balanced, such as: hardware complexity, battery consumption, cost, processing power available to the CPU of the tire monitoring units, etc. In the preferred embodiment shown in FIG. 6, the tire-related parameter or parameters estimated by the CPU (6) of the tire monitoring units (2) and/or by the processing unit (21) of the controlling unit (11) is/are eventually made available to the vehicle control system (12) via the interface (19).

Referring also to FIG. 5, in an exemplary operation mode, each tire (1) fitted to a wheel of the vehicle (100) is caused to rotate on a rolling surface (e.g., the road surface) during the vehicle run. As a consequence of the fitting, the tire is deformed so as to form a contact area (patch) between the tire (1) and the rolling surface. Each tire monitoring unit (2) comprised within a tire (1) is preferably paired with said tire, i.e., identifying information of the tire (e.g., tire identifier, tire size, tire model, tire radius etc.) is stored within the memory associated with the CPU (6) of the respective tire monitoring unit (2).

Pressure and temperature measurements can be performed by the tire monitoring unit (2) comprised within the tire (1) at discrete time intervals, for example every 30 seconds or upon request of the external controlling unit (11) at any time during tire rolling. The start of pressure and temperature measurement can be triggered based on a signal sent by the radial accelerometer (3) when the tire starts to rotate, or upon request from the external controlling unit (11) or the vehicle control system (12).

Preferably, the controlling unit (11) can monitor the vehicle status based on positioning data (e.g., GPS data), provided for example by the vehicle positioning system (13).

When the speed of the vehicle (100) is between 40 km/h and 100 km/h, (or more preferably within 60 km/h and 80 km/h) and/or when the absolute value of the longitudinal acceleration is lower than 0.3 m/s$^2$, the controlling unit (11) determines that the access conditions are met and communicates to each of the tire monitoring units (2) to start the sampling of the sensing signal generated by the radial accelerometer (3), in order to start the estimation of the tire contact area length. A further access condition may be based on the check that the absolute value of the lateral acceleration of the vehicle is lower than 0.3 m/s$^2$.

The controlling unit (11) further communicates to each of the tire monitoring units (2) the speed V of the vehicle so that said tire monitoring units (2) can set an initial absolute threshold value for the acceleration, e.g. as $V^2/(2R)$, wherein R is a tire radius. Alternatively, the controlling unit (11) can communicate to said tire monitoring units (2) the initial value of said threshold.

The controlling unit (11) may also communicate the amount of time to be allocated for the measurements, or the overall number of accelerometer sensing signal samples to be taken. The amount of time or the overall number of accelerometer sensing signal samples can also be directly stored in the software/firmware of each tire monitoring unit (2). In particular, the amount of time should be long enough to encompass several complete tire roundtrips at the vehicle speeds of interest. For example, the amount of time can be of several seconds (e.g., 10 seconds).

When the measurement is started, the sensing signal generated by the radial accelerometer (3), which is a measure of the tire radial acceleration, is undersampled. Here we consider a sampling at 250 Hz. In this example, an overall number of at least one thousand of samples is taken within the allocated amount of time. Such a tire monitoring unit working at 250 Hz will take an overall number of 2,500 samples in 10 seconds.

During the sampling of the radial acceleration sensing signal, the value of each sample is compared with said threshold value in order to determine whether each sample value can be considered as representative of a passage of the tire monitoring unit in correspondence of the contact area between the tire and the rolling surface.

In case of having set the initial threshold value at $0.5*V^2/R$, radial acceleration samples whose absolute value is lower than said threshold will be considered as representative of passages of the tire monitoring unit in correspondence of the tire contact area. In fact, as we said, when the tire monitoring unit (2) remains in correspondence of the tire contact area, the radial acceleration is substantially zero since the tire monitoring unit is locally moving on a substantial rectilinear path.

The threshold value, initially set as $V^2/(2R)$, can be changed in response to variation of the rotation speed of said tire (1). The updated threshold value can be communicated by the controlling unit (11) to each of said tire monitoring units (2) or can be calculated by each tire monitoring unit (2) itself. In the latter case, an estimation of the rotation speed of the tire (1) can be carried out internally in each tire monitoring unit (2) by estimating the roundtrip time based on the time interval between consecutive samples or groups of samples having values lower than the set threshold. The estimated roundtrip time is used for obtaining the tire rotation speed and/or an updated speed of the vehicle, which can be used to update the threshold value.

The determination of whether a radial acceleration sample can be considered as representative of a passage of the tire monitoring unit (2) in correspondence of the tire contact area can be carried out on a sample by sample basis. Alternatively, a sequence of samples can be obtained, followed by an extraction from said sequence of samples of a set of samples having values representative of passages of the tire monitoring unit (2) in correspondence of the tire contact area.

In both the aforementioned cases, the occurrences of the samples having values representatives of passages of the tire monitoring unit (2) in correspondence of the tire contact area are counted by the CPU (6) of the tire monitoring unit (2), so as to obtain a first number of samples being representative of passages of the tire monitoring unit (2) in correspondence of the tire contact area. Preferably, the overall number of samples is also determined by counting the samples obtained. Alternatively, the overall number of samples can be directly obtained as the product of the sampling frequency and said amount of time, or the ratio between the amount of time and the sampling period (i.e., the inverse of the sampling frequency).

Said first number of samples (corresponding to passages of the tire monitoring unit (2) in correspondence of the tire contact area) can be used by the tire monitoring unit (2) to estimate at least one tire-related parameter, particularly the length of the tire contact area, or can be communicated to the controlling unit (11) or directly to the vehicle control system (12).

In particular, this first number of samples can be used for determining the probability of said tire monitoring unit (2) to be in correspondence of the tire contact area at a certain time, which can be calculated for example as the ratio between said first number of samples and said overall number of samples (2,500 measurements in this example).

Alternatively, said probability can be calculated as the ratio between the time spent by the tire monitoring unit (2) in correspondence of the tire contact area (i.e., the ratio between the first number of samples and the sampling frequency, or the product of the first number of samples and the sampling period) and said amount of time in which the measurement is carried out (10 seconds in this example).

To determine the overall number of samples, it is not really necessary to actually sample the radial acceleration sensing signal at each sampling period. Samples within tire roundtrips to be taken when the tire monitoring unit (2) is certainly not in correspondence of the tire contact area can be skipped and substituted by "virtual samples" which are not actually taken. In such case, the overall number of samples is determined as the sum of the number of actual samples taken and the number of virtual samples. Advantageously, this can result in a significant saving of the energy used by the battery (8) of the tire monitoring unit (2) for the estimation of the tire contact area length, ultimately increasing the lifespan of its battery (8).

The CPU (6) of the tire monitoring unit (2) can thus be configured, via suitable software/firmware modules, to switch off the sampling of the radial acceleration sensing signal during a switch off time comprised between two consecutive passages of said tire monitoring unit in correspondence of said tire contact area, i.e., within a roundtrip outside said tire contact area. Such software/firmware modules are also configured for determining the number of virtual samples (i.e., the number of samples not actually taken) based on the sampling frequency and said switch off time.

This is particularly convenient in the embodiment wherein the tire monitoring unit (2) calculates the time occurring between two consecutive round trips. In this case, said switch off time can be preferably set in the range between one third and three quarters of the roundtrip time.

At the expiring of a maximum amount time allocated for the sampling of the radial acceleration sensing signal, the external controlling unit (11) communicates each tire monitoring unit (2) to stop the sampling and to communicate their outcome, for example said first number of samples.

Alternatively, the external controlling unit (11) can communicate each tire monitoring unit (2) to stop the sampling when some stopping conditions are met, for example if the vehicle speed is outside a predetermined speed range or if an absolute value of the longitudinal acceleration exceeds a predetermined acceleration threshold.

Alternatively, the tire monitoring unit (2) itself can stop the sampling of the radial acceleration sensing signal at the expiring of the maximum amount of time, or, in the case wherein the tire monitoring unit (2) can estimate the vehicle speed, when at least one of the rotation/vehicle speed or the longitudinal acceleration is outside a predetermined range.

Once the sampling of the radial acceleration sensing signal is over, the following quantities are available to the tire monitoring system for the estimation of the tire contact area length: a first number of samples being representative of passages of said tire monitoring unit in correspondence of the tire contact area during the amount of time allocated for collecting the radial acceleration samples; an overall number of (actual and possibly virtual) samples, or its corresponding value calculated based on the sampling frequency and the amount of time allocated; tire pressure and/or tire temperature.

Based on such data, at least one tire-related parameter can be estimated. Particularly, the length of the tire contact area and/or the load exerted on the tire (1) by the vehicle can be estimated, as explained below.

As previously discussed, the tire-related parameter, particularly the length of the tire contact area and/or the load exerted on the tire (1) by the vehicle, can be estimated by said tire monitoring units (2), or by the external controlling unit (11), or by the vehicle control system (12).

For example, the CPUs (6) of the tire monitoring units (2) can process the acceleration data and send to the control unit (11), for each tire monitoring unit (2), the first number N1 of radial acceleration samples representative of passages of each tire monitoring unit in correspondence of the tire contact area, the overall number N2 of (actual and possibly virtual) radial acceleration samples, the tire pressure and the tire temperature values. The processing unit (21) of the controlling unit (11) can then estimate the length of the tire contact area and/or the load exerted by the vehicle on the tires based on such data. From the estimation of the length of the tire contact area and/or the load exerted on the tires by the vehicle, the processing unit (21) of the controlling unit (11) or the vehicle control system (12) can then estimate the vehicle weight.

In particular, based on the fact that the set of samples taken in the amount of time at the sampling frequency is a statistic set, the ratio N1/N2 corresponds to a probability p of finding each tire monitoring unit in correspondence of the contact area of the respective tire at a certain time during tire rolling.

A length PL of the tire contact area could be then estimated based on the tire circumference and such probability p, by using the formula:

$$PL = 2\pi Rp = 2\pi R N1/N2$$

wherein R is a radius (e.g., a rolling radius) of the tire.

The tire pressure and the length PL of the tire contact area can be then used to estimate the load exerted by the vehicle on the tire.

For example, the load Fz exerted by the vehicle on the tire can be calculated from the estimated length PL of the tire contact area based on a polynomial fitting function of the tire contact area length PL, e.g., by using the formulas:

$$Fz = A(P) + B(P)*PL$$

$$Fz = A(P) + B(P)*PL + C(P)*PL^2$$

wherein P is the tire pressure, PL is the length of the tire contact area and A, B, C are calibration parameters depending on the tire pressure P, whose values can be obtained by a calibration performed for the tire model to which the tire monitoring unit is associated. The calibration can be performed by using conventional testing machines on which a tire inflated at a controlled pressure and temperature is rotated over a conveyor belt under controlled conditions of exerted load and rotation peed. Such calibration coefficients A, B, C could be stored in the memory of the tire monitoring unit, the controlling unit and/or communicated to the vehicle control system.

In a more preferred embodiment, the load Fz exerted by the vehicle on the tire can be more precisely calculated from the estimated tire contact area length PL based on a polynomial function of the tire contact area length PL wherein the coefficients of said polynomial function further depend on tire pressure and rotation speed, e.g., according to above mentioned formulas:

$$Fz = A(P,\omega,T) + B(P,\omega,T)*PL$$

$$Fz = A(P,\omega,T) + B(P,\omega,T)*PL + C(P,\omega,T)*PL^2$$

wherein P is the tire pressure, PL is the length of the tire contact area, $\omega$ is the tire rotational speed and $A(P,\omega,T)$, $B(P,\omega,T)$, $C(P,\omega,T)$ are calibration parameters depending on the tire pressure P, tire rotation speed $\omega$ and tire temperature T.

Figure 7:
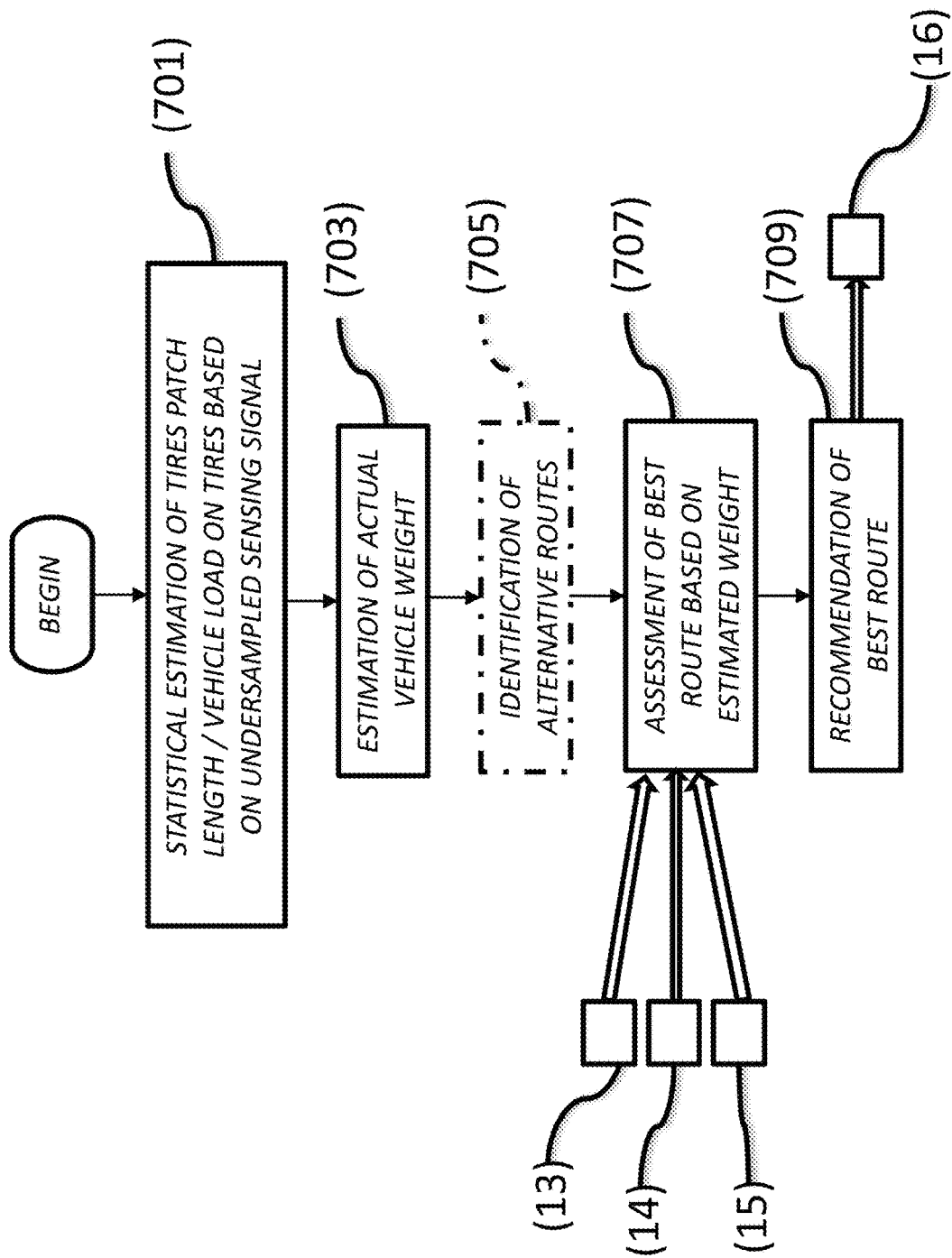

Once the at least one tire-related parameter, particularly the load Fz exerted by the vehicle on the tire, has been statistically estimated (block (701) in FIG. 7), the weight of the vehicle can be estimated (block (703) in FIG. 7). For example, considering a vehicle with two axles, each of which having two wheels (like a car), the vehicle weight can be estimated as the sum of the estimated load Fz exerted by the vehicle on each of the four tires.

After having estimated the vehicle weight, the vehicle control system (12), based on the data made available by the vehicle positioning system (13) and the roadways maps available in the database (14), can optionally identify the alternative routes available for going from the an origin (which can be the current vehicle position, provided by the vehicle positioning system (13)) to a destination (which can be inputted by the vehicle driver through the user interface (15)) (block (705) in phantom in FIG. 7) and make a determination of the best route for going from the origin (to the destination (block (707) in FIG. 7).

Assuming for example that two routes, "route 1" and "route 2", are available for going from point A (origin) to point B (destination), and that, based on the knowledge of routes characteristics available in the database (14), the vehicle control system (12) assesses that, based on the estimated vehicle weight, route 2 is more suitable than route 1, then the vehicle control system recommends to the vehicle driver (e.g., through the display (16)) to take route 2 and not route 1.

The route characteristics taken into consideration by the vehicle control system (12) in assessing which is the best route to take can include travel length of each possible route and additional important parameters related to the route, such as gradients and downhill slopes encountered along a route, which influence the fuel consumption/energy usage, degree of winding of the routes etc. Referring again to the example of two routes, "route 1" and "route 2", available for going from point A to point B, and that along route 1 substantial uphills/downhills are encountered, whereas route 2 is essentially flat (despite possibly being longer in terms of travel distance), in presence of a relatively high estimated vehicle weight compared to the empty weight (meaning that the vehicle is heavily loaded) the vehicle control system (12) may recommend to the vehicle driver to take route 2, so as to discourage the vehicle driver from taking a winding route or a route with substantial uphills/downhills.

In the above, based on an accurate estimation of the vehicle weight and on the knowledge of the characteristics of the available routes, the vehicle control system (12) can thus suggest the vehicle driver which, among two or more alternative routes available for reaching a destination from an origin, is the better route (block 709 in FIG. 7), for reasons of safety: for example, when the weight is greater than a predetermined value, the vehicle control system will recommend the route with less uphills/downhills and/or the degree of windings or curves.

The invention claimed is:
1. A method for determining a route for a vehicle, the method including:
   a) including a navigation module in a vehicle fitted with tires;
   b) coupling a tire monitoring unit to at least one tire of said tires and to the navigation module, said tire monitoring unit including a processing unit and at least one tire deformation sensing element configured to generate a sensing signal descriptive of deformations undergone by said tire during rotation on a rolling surface, said deformations forming a contact area between said tire and said rolling surface;
   c) during the rotation of said at least one tire of the vehicle fitted with such tire monitoring unit, undersampling, through the processing unit, said sensing signal generated by said sensing element including the sensing signal generated in correspondence of passages of said sensing element through said contact area for a number of said passages used for obtaining, during said rotation, through the processing unit, an estimated length of said contact area based on said undersampled sensing signal, said undersampling occurring at a sampling frequency of 1.5 KHz or less;
   d) estimating, through the processing unit, a weight of the vehicle based on such estimated length,
   e) identifying, through the processing unit, at least two alternative routes; and
   f) selecting, through the processing unit, at least one route among said at least alternative routes based on such estimated weight of the vehicle.

2. The method of claim 1, including, for each sample of said undersampled sensing signal, determining whether the sample has a value representative of a passage of said sensing element in correspondence of said contact area, so as to obtain a first number of samples representative of passages of said sensing element in correspondence of said contact area within an amount of time corresponding to said number of said passages.

3. The method according to claim 2, further comprising:
   g) interrupting said undersampling of said sensing signal after at least one occurrence of a sample related with a passage of said sensing element in correspondence of said contact area;
   h) starting again the undersampling of said sensing signal after a switch off time;
   wherein said obtaining an estimated length of said contact area comprises calculating a second number of virtual samples based on a frequency of said undersampling and said switch off time.

4. The method according to claim 3, further comprising adjusting said switch off time in response to variations of a rotation speed of said tire.

5. The method according to claim 2, further comprising determining an overall number of samples based on a frequency of said undersampling and said amount of time, and wherein said obtaining an estimated length of said contact area is based on said first number and said overall number.

6. The method according to claim 2, wherein said determining whether the sample has a value representative of a passage of said sensing element in correspondence of said contact area is performed by defining a threshold value and comparing the value of said samples with said threshold value.

7. The method according to claim 6, wherein said first number of samples is obtained by extracting from a sequence of samples of the undersampled sensing signal a set of samples by selecting samples out of said sequence of samples based on a comparison with said threshold value.

8. The method according to claim 7, further comprising:
   setting an initial value of said threshold before starting said undersampling, and
   adjusting said threshold value in response to variations of a rotation speed of said tire.

9. The method according to claim 8, further comprising:
   communicating at least said initial value of said threshold to the tire monitoring unit from a controlling unit external to said tire.

10. The method according to claim 9, wherein said tire monitoring unit is secured to a crown portion of said tire, and wherein said at least one sensing element is further configured to measure at least a radial acceleration of said crown portion during rotation of said tire.

11. The method according to claim 10, wherein said tire monitoring unit further comprises at least one a tire pressure sensing element and/or a tire temperature sensing element.

12. The method according to claim 11, wherein said estimating the weight of the vehicle comprises estimating a load exerted on said at least one tire by the vehicle.

13. The method according to claim 12, wherein said load is estimated based on said estimated length of the contact area and said tire pressure.

14. The method according to claim 13, wherein said load is estimated based on a polynomial function of degree at least one of said estimated length of the contact area.

15. The method according to claim 1, further comprising:
   starting the undersampling of the sensing signal when at least one of the following access conditions is met:
   a speed of the vehicle is comprised within a predetermined speed range,
   an absolute value of longitudinal acceleration of the vehicle is lower than a predetermined amount.

16. The method according to claim 15 wherein the predetermined speed range is between 40 to 100 km/h, and the predetermined amount is 0.3 m/s$^2$.

17. The method according to claim 1, further comprising:
   stopping the undersampling of the sensing signal when at least one of the following stopping conditions is met:
   an absolute value of longitudinal acceleration of the vehicle exceeds a predetermined acceleration threshold,
   a speed of the vehicle is outside a predetermined speed range,
   an amount of time corresponding to said number of said passages exceeds a predetermined maximum amount of time.

18. The method according to claim 17 wherein the predetermined acceleration threshold is 0.3 m/s$^2$, the predetermined speed range is between 40 to 100 km/h, and the predetermined maximum amount of time is 10 seconds.

19. A system for selecting a route for a vehicle fitted with tires, the system including
   a navigation module,
   a tire monitoring unit coupled with at least one of said fitted tires, said tire monitoring unit comprising
   i) at least one sensing element configured to generate a sensing signal descriptive of deformations undergone by said tire during rotation on a rolling surface, said deformations forming a contact area between said tire and said rolling surface, and
   ii) at least one processing unit being configured to undersample, during the rotation on the rolling surface, said sensing signal generated by the at least one sensing element including the sensing signal generated in correspondence of passages of the at least one sensing element through said contact area for a number of said passages used to obtain, during the rotation, an estimated length of said contact area based on said undersampled sensing signal, wherein said undersamplinq occurs at a sampling frequency of 1.5 KHz or less;

wherein the navigation module is coupled with the tire monitoring unit, the navigation module being configured to:

estimate weight of the vehicle based on the estimated length received from the tire monitoring unit, identify at least two alternative routes; and select at least one route among said at least two alternative routes based on the estimated weight of the vehicle.

\* \* \* \* \*